United States Patent [19]
Mills

[11] 3,807,476
[45] Apr. 30, 1974

[54] PNEUMATIC TIRES

[75] Inventor: Iain C. Mills, Lichfield, England

[73] Assignee: Dunlop Holdings Limited, London, England

[22] Filed: May 21, 1971

[21] Appl. No.: 145,610

[30] Foreign Application Priority Data
June 3, 1970 Great Britain................... 26702/70

[52] U.S. Cl............................. 152/362 R, 152/352
[51] Int. Cl. ...................... B60c 15/06, B60c 3/00
[58] Field of Search......... 152/354, 362 R, 352, 353

[56] References Cited
UNITED STATES PATENTS

| | | | |
|---|---|---|---|
| 3,115,179 | 12/1963 | Shepherd | 152/354 |
| 3,280,877 | 10/1966 | Hanus | 152/354 |
| 3,232,331 | 2/1966 | Cappa et al. | 152/354 |
| 3,339,610 | 9/1967 | Fausti et al. | 152/354 |
| 3,486,547 | 12/1969 | Powers | 152/352 |
| 3,392,772 | 7/1968 | Powers | 152/352 |
| 3,656,532 | 4/1972 | Roberts | 152/353 |

FOREIGN PATENTS OR APPLICATIONS
1,091,507   11/1967   Great Britain................. 152/362 R Primary Examiner—Robert G. Sheridan
Assistant Examiner—Robert Saifer
Attorney, Agent, or Firm—Stevens, Davis, Miller & Mosher

[57] ABSTRACT

A pneumatic tire with tread, beads and sidewalls in which each bead is provided with a rubber apex of rubber compound of hardness at least 60°BS extending into the lower sidewall region of the tire and a reinforced strip extending around the bead and into the lower sidewall region of the tire both axially inwardly and axially outwardly of the tire. Together the reinforced strip and the rubber apex form a cantilever lower sidewall construction, the ratio of the overall internal width of the tire to the distance between the axially outermost tire contacting points on the wheel rim being in the range 125 to 200 percent, of which the following is a specification.

9 Claims, 1 Drawing Figure

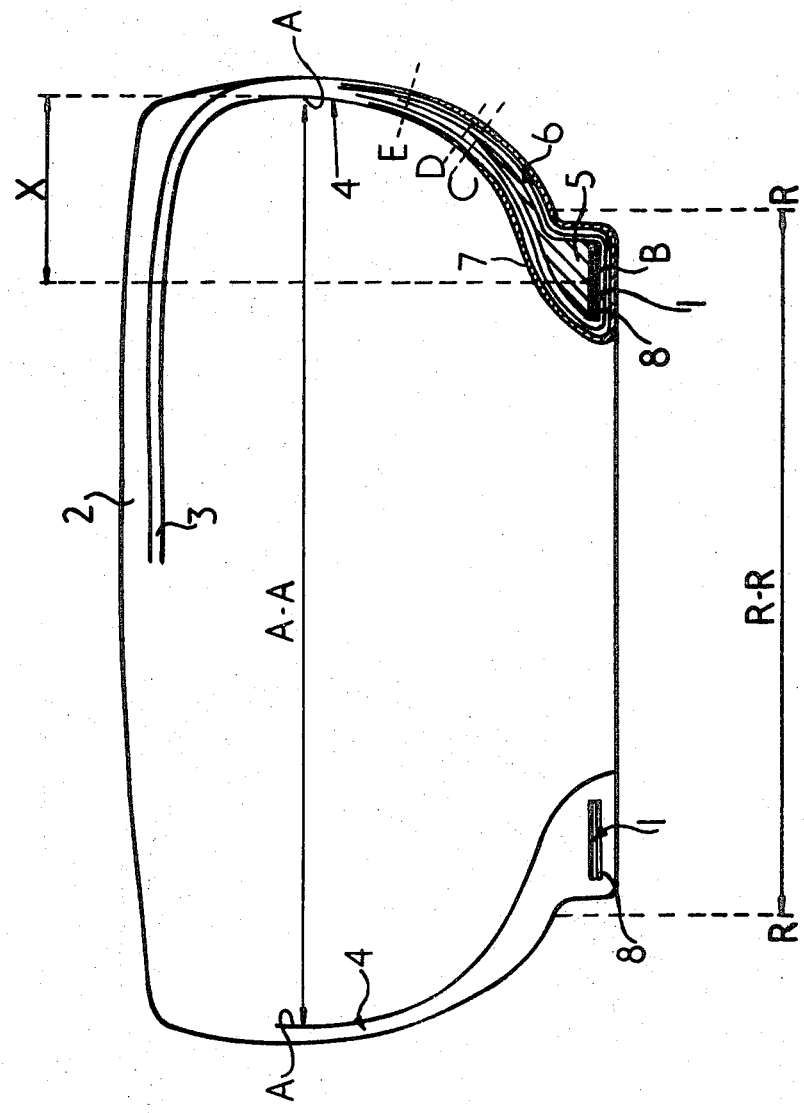

PNEUMATIC TIRES

This invention relates to pneumatic tires.

According to the invention a pneumatic tire comprises a tread, a pair of annular beads and sidewalls extending between the tread and the beads in which each bead is provided with a rubber apex of a rubber compound with a hardness of at least 60° shore a extending into the lower sidewall region of the tire and a reinforced strip extending around the bead and into the lower sidewall region of the tire both axially inwardly and axially outwardly of the tire to form, together with said apex, a cantilever lower sidewall construction whereby when the tire is inflated to its normal working pressure and mounted on a wheel rim the ratio of the overall width of the tire to the distance between the axially outermost tire contacting points on the wheel rim is in the range 125 to 200 percent.

The tyre may be a radial or a cross-ply tire and the reinforcing cords in the carcass of the tire may be steel or textile cords.

It is to be noted that for the purposes of this specification the overall width of the tire is the maximum internal width of the tire when inflated and mounted on a wheel rim. This measure is a better measure of the width of the tire carcass since the external width of the tire is liable to considerable variation by positioning of ribs and/or grooves on the sidewall.

When the tire is a cross-ply tyre, cord fabric carcass plies of any bias angle may be used but preferably the maximum bias angle of the carcass plies inn the crown region of the finished tire does not exceed 30°. Also in a cross-ply tire the edges of the reinforced strip and the radially outer edge of the apex preferably lie in the region where the distances from the bead center to said edges measured along the tire sidewall are from 85 to 160 percent, preferably 100 to 160 percent, of the axial overhang of the sidewall of the tire, said axial overhang being defined as the axial distance between the center of the bead and the point on the inside of the tire casing at which the tire is of maximum internal width when inflated and mounted on a wheel rim.

When the tire is a radial ply tyre the edges of the reinforced strip and the radially outer edge of the apex preferably lie in the region where the distances from the bead center to the edges measured along the tire sidewall are from 140 to 210 percent of the axial overhang of the sidewall of the tire, the axial overhang being defined as above.

The reinforced strip is preferably a strip of cord fabric and must be stiff and strong relative to the carcass plies in the upper sidewalls of the tire. Preferably the cord fabric is a steel cord fabric although other types of cords may be used in one or more layers to make up the strip, e.g. glass fiber cords, carbon fibre cords.

The cord reinforced strip preferably consists of a single layer of cord reinforced fabric with a bias angle of 30° or lower in the finished tire measured adjacent to the bead, a bias angle in the range 17° to 30° being particularly preferred.

If desired a further and more flexible strip, e.g. a chafer strip, may be positioned outside the reinforced strip in the bead region. This is particularly useful in the case of a tubeless tire where an airtight seal on the rim must be made. The chafer strip may for example be a rubber strip.

The beads may be of the usual type consisting of a plurality of wires or they may be multi-strip beads which consist of a plurality of turns of metal strip, the center of the bead being taken for the purposes of measurement as the center of the area of the cross-section of the bead.

The rubber apex associated with each bead extends into the lower sidewall of the tire and is preferably made of a rubber having a hardness of at least 70° shore a.

The tires of this invention have a wide tread, relative to the wheel rim on which they are mounted and hence have a large ground-contact patch giving very good grip for the size of wheel rim. The invention provides a method of enabling low aspect ratio tires with wide treads to be used on relatively narrow rims. The aspect ratio, i.e. the ratio of external section height to external section width of the inflated tire, of the tires of this invention is thus advantageously comparatively low e.g. between 25 and 65 percent.

The upper sidewall region is flexible but the cantilever construction of the lower sidewall region of the tire gives an extremely stiff lower sidewall so that good road-holding is achieved without the loss of stability which would otherwise result from the relatively narrow wheel rim.

A tire in accordance with the invention will now be described by way of example only, with reference to the accompanying drawing which is a sectional profile of the tire fitted on a wheel rim in the inflated condition showing the internal construction of the lower sidewall region of the tire.

As shown the tire comprises a pair of multi-strip beads 1, a tread 2 and a cross-ply carcass 3 having sidewall regions 4.

Each bead 1 consists of a spirally wound metal strip 8 and extending radially outwardly from each bead 1 is an apex 5 of hard rubber (Hardness 77° BS) or about 78° shore a which terminates in the lower sidewall region of the tire at D.

A steel cord reinforced strip 7 extends around the bead 1 outside the carcass plies 6 which are turned up around the bead 1. The edges of the reinforced strip 7 lie at C and E in the lower sidewall of the tire.

The carcass 3 is a low angle cross-ply carcass having a bias angle of 26°, the steel cords in the reinforcing strip 7 having a bias angle of 20°.

The axial overhang of the sidewall of the tire in the drawing is shown by distance X, this being the axial distance between the center of the bead (point B on the drawing) and the point of maximum tire sectional width on the inside of the tire carcass (point A on the drawing).

In the tire shown in the drawing the points D, C and E on which lie the radially outer edge of the apex 5, and the edges of the reinforced strip 7 respectively are at distances from the bead center measured along the sidewall which are respectively approximately 109, 100 and 136 percent of the axial overhang of the sidewall (distance X on the drawing).

Similarly the ratio of the overall width of the tire measured inside the carcass (distance A—A on the drawing) to the distance between the axially outermost tire contacting points on the wheel rim (distance R—R on the drawing) is approximately 132 percent.

If the carcass were a radial carcass the edge of the reinforced strip 7 would extend further into the sidewalls since the sidewalls of the radial ply carcass are more flexible and would therefore need more support to give the desired stability to the tire.

Having now described my invention what I claim is:

1. A pneumatic tire having an overall width 25 to 100 percent greater than its rim width when mounted on a rim and inflated to its normal working pressure, comprising: a tread, a carcass ply, a pair of annular beads, sidewalls extending between the tread and beads and cantilever means for stiffening each lower sidewall comprising a rubber apex of a rubber compound with a hardness of at least 60° Shore A extending into each lower sidewall region and a reinforcing strip, separate from the carcass ply, extending around each bead and into the lower sidewall region of the tire both axially inwardly and axially outwardly of the bead, the edges of the reinforcing strip and the radially outer edge of the apex being disposed in a region where the distances from the center of the bead to said edges measured along the tire sidewall are from 140 per cent to 210 per cent of the axial overhang of the sidewall of the tire, the axial overhang being defined as the axial distance between the center of the bead member and the point on the inside of the tire casing at which a tire is of maximum internal width when inflated and mounted on a wheel rim.

2. A tire according to claim 1, which is a radial ply tire.

3. A tire according to claim 1, which is a cross-ply tire.

4. A tire according to claim 1 in which the maximum bias angles of the cords of the carcass ply in the crown region of the finished tire do not exceed 30°.

5. A tire according to claim 1 in which the reinforcing strip is a strip of cord fabric.

6. A tire according to claim 5 in which the said cord fabric includes steel cords.

7. A tire according to claim 5 in which the cord reinforcing strip consists of a single layer of cord reinforced fabric with a bias angle of 30° or lower in the finished tire measured adjacent to the bead.

8. A tire according to claim 7 in which said bias angle is in the range 17° to 30°.

9. A tire according to claim 1 in which the rubber apex associated with each bead is made of a rubber having a hardness of at least 70° shore a.

* * * * *

UNITED STATES PATENT OFFICE
CERTIFICATE OF CORRECTION

Patent No. 3,807,476　　　　　　　　　Dated April 30, 1974

Inventor(s) Iain C. Mills

It is certified that error appears in the above-identified patent and that said Letters Patent are hereby corrected as shown below:

At each of the following occurrences, "shore a" should read --Shore A--:

Column 2, lines 9 and 10 and line 39;
column 4, line 23.

Signed and sealed this 1st day of October 1974.

(SEAL)
Attest:

McCOY M. GIBSON JR.　　　　　　　　C. MARSHALL DANN
Attesting Officer　　　　　　　　　　Commissioner of Patents